United States Patent Office 3,522,068
Patented July 28, 1970

3,522,068
CEMENT COMPOSITION AND PROCESS
FOR PREPARING IT
Stanislaw Bastian, 50–28 Wita Stwosza St., Gdansk-Oliwa, Poland, and Malgorzata Helena Gruener, 73 Fornolskiej St., Gdansk, Poland
No Drawing. Continuation of application Ser. No. 393,416, Aug. 21, 1964. This application Jan. 27, 1969, Ser. No. 805,926
Claims priority, application Poland, Apr. 15, 1964, P 104,330
Int. Cl. C04b 13/10, 13/20
U.S. Cl. 106—87          5 Claims

ABSTRACT OF THE DISCLOSURE

A process of preparing a novel cement composition comprising dissolving a water-soluble carbonate of a mono to trivalent metal, a water-soluble sulfate of the same metal and, if needed, a sodium or aluminum fluosilicate, sodium chloride, a surface active substance, and a polyvinyl polymer in water maintaining the aqueous solution at about 25 to 50° C. for 8 to 16 hours, then ripening this aqueous solution for at least 72 hours with free access of air, then, just prior to the intended use for the cement composition, adding to the ripened aqueous solution a hydraulic additive such as a siliceous earth, a granulated blast furnace slag or the like, an aerial binding agent such as quicklime or slaked lime, portland cement, and possibly a filler to the solution, and then using the cement mixture thus formed. There may also be added with the cement the aerial binding agent and the hydraulic additive, a small quantity of a solid gas generating substance.

This application is a continuation of Ser. No. 393,416, filed Aug. 21, 1964, now abandoned.

This invention relates to a cement composition and a process for its manufacture.

The cement composition of the invention is intended for general cementing purpose, and also for the manufacture of intergranular porous concrete, the manufacture of prefabricated structural elements, for carrying out concreting operations under water, for ground reinforcement, for example, coastal reinforcement, and the like.

In constructional work it is often necessary to accelerate or retard the setting of the cement. This is usually achieved by the addition of chemical substances, for example, calcium chloride, sodium silicate, phosphoric acid or the like. In certain cases, however, these chemicals are inadequate, for example, when a cement mixture is required that must retain its initial viscosity for a certain period, and must set and harden rapidly at the end of that period. A mixture having this property is desired when there is a risk of its being washed away by water, or when settling out has to be prevented in the case of mixtures having a very low initial viscosity. Thus, the mixture must be sufficiently fluid in the first stage to permit proper mixing and also in the second stage to facilitate its being transported, charged and compressed, whereas in the third stage it has to thicken, set and harden as rapidly as possible.

A cement composition that fulfills these requirements is known. In addition to cement and water in the usual proportions, it contains fly ash, an alkali metal carbonate, an alkali metal chloride, aluminium sulphate and aluminium acetate. Based on the weight of the cement, the proportion of fly ash is about 35%, and the proportion of the said chemical additives is 15%, the ratio of the alkali metal salts to the aluminium salts being 3:1.

It has been found that, although the aforesaid additives improve some of the properties of cement suspensions that consist solely of cement and water, including the properties mentioned above, positive results can be achieved only in certain cases. One reason for this is that the proportions of the additives were given roughly and were not sufficiently accurate relatively to one another. Another reason is that in the manufacture of the cement composition insufficient attention was paid to certain technical details that are important for producing a composition that can be successfully used.

The present invention is based on the observation that by including a novel combination of chemical compounds and additional substances in a cement composition, the results obtainable with cement compositions can be substantially improved and their field of application considerably widened with respect to caulking or sealing operations by the cement injection process in underground constructional work, and also that the use of cement compositions can be extended to fields of the building industry and civil engineering to which they have not hitherto been applied, for example, the cementing of concrete cable ducts, the production of prefabricated building elements, and the like.

Accordingly, the present invention provides a cement composition which comprises 100 parts by weight of cement, 10 to 50 parts by weight of a hydraulic additive, 2 to 10 parts by weight of an aerial binding agent, 2 to 5 parts by weight of a water-soluble carbonate of a mono- to trivalent metal, 1 to 4 parts by weight of a water-soluble sulphate of such a metal, and 50 to 200 parts by weight of water.

The cement composition may also contain as optional additions, or as essential additions depending on the purpose for which the cement composition is intended, one or more of the following: up to 2 parts by weight of a water-soluble fluosilicate of a mono- to trivalent metal, up to 2 parts by weight of a water-soluble chloride of such a metal, up to 0.5 part by weight of a surface-active substance, up to 10 parts by weight of a vinyl polymer, up to 0.5 part by weight of a gas-generating substance, and up to 200 parts by weight of a neutral filler.

There is preferably used as the hydraulic additive fly ash, silica, bentonite or basic granulated blast furnace slag or a mixture of two or more of these substances, and as the aerial binding agent quicklime or slaked lime. As the mono- to trivalent metals are preferably used sodium, potassium, aluminium and copper. A ligninsulphonic acid derivative is preferably used as a surface-active substance, an emulsion of polyvinyl acetate or polyvinyl chloride is preferably used as a vinyl polymer, aluminium powder is preferably used as a gas generating substance, and sand, plastics scrap, sawdust or the like may be used as a neutral filler. The cement consists of pure portland cement having a high content of alite/more $C_3S$ than $C_2S$/and containing not more than 2% of gypsum.

The invention also provides a process for the preparation of a cement composition described above, wherein the water-soluble inorganic salts and, when present, the surface-active substance and the vinyl polymer, are taken up in a part of the total amount of water, the resulting aqueous liquor is maintained at a temperature of 25–50° C. for 8 to 16 hours and then ripened for at least 72 hours with the free access of air, and the resulting ripened concentrate, immediately before the cement composition is required for use, is mixed with the remainder of the water and then the solid ingredients are mixed with the liquor. Advantageously, the inorganic salts are dissolved in the said part of the water in the following sequence: fluosilicate, carbonate, sulphate and chloride, each salt being completely dissolved before the next salt is added, and, when present, the surface-active substance and the vinyl polymer are added after all the inorganic salts have dissolved. The vinyl polymer is thus the last component to be added. It is also of advantage first to grind the solid ingredients other than the cement, then mix them with the cement, and finally mix the resulting mixture with the liquor.

The cement composition of the invention gives good results in all cases where the properties mentioned above are required, namely, a low initial viscosity and, after a working up stage, rapid setting and hardening. Moreover, settling out does not take place, and the strength increases rapidly to give high final strengths. The hardened material is of exceptional density, is of low capillarity, and has a high chemical resistance. If desired, slight swelling may take place.

A review of the advantages of the cement compositions of the invention is given in the table below.

In certain cases it is of advantage to adjust the composition of the cement mixture to suit particular requirements.

The following examples illustrate the invention, the parts being by weight.

Example 1

When cementing has to be carried out in rapidly flowing water, which may carry away the cement composition that has been forced into position under pressure, the proportions of the hydraulic additive, of the aerial binding agent and of the cement-active salts, especially the carbonates and fluosilicates, are increased, and the proportion of water is reduced.

A cement composition, that is suitable for filling rather remotely situated caverns or crevices in the ground, or in mountains, in the presence of rapidly flowing underground water, has the following composition:

|  | Parts |
|---|---|
| Portland cement | 100.0 |
| Fly ash | 20.0 |
| Siliceous earth | 5.0 |
| Quicklime | 8.0 |
| Sodium carbonate | 2.8 |
| Potassium carbonate | 0.5 |
| Copper sulphate | 0.3 |
| Aluminium sulphate | 1.7 |
| Sodium fluosilicate | 0.8 |
| Sodium chloride | 0.3 |
| Water | 74.0 |

This composition is characterized particularly by its very high rate of setting and hardening, and its very great final strength and density.

Example 2

When cementing has to be carried out under water that is flowing at a normal speed, but the cement composition has to be transported over a considerable distance, for example, when caulking deep shafts, the proportions of sulphates, chlorides and water should be increased, and the proportions of the hydraulic additives and aerial binding agent should be decreased. The cement composition then remains fluid for a longer period, and yet still sets and hardens rapidly. For this purpose a cement mixture having the following composition is suitable:

|  | Parts |
|---|---|
| Portland cement | 100.0 |
| Fly ash | 17.0 |
| Siliceous earth | 3.0 |
| Slaked lime | 5.0 |
| Sodium carbonate | 3.3 |
| Copper sulphate | 0.4 |
| Aluminium sulphate | 2.0 |
| Sodium fluosilicate | 1.2 |
| Sodium chloride | 0.5 |
| Water | 93.0 |

The main characteristics of this mixture are its high penetrating power, the long period during which it remains in the fluid state, and the high speed with which it sets and hardens.

Example 3

The caulking or sealing of dams, dikes, coasts or foundation trenches, when the earth is of low porosity and in the presence of very slowly flowing water, has to be carried out with a cement mixture that has a high penetrating power and remains in the fluid state for a long time. For this purpose the proportion of the hydraulic additives is decreased, a surface-active substance is added, the proportion of water is increased, and the aluminium sulphate is replaced by sodium sulphate, as illustrated by the following cement composition:

|  | Parts |
|---|---|
| Portland cement | 100.0 |
| Fly ash | 10.0 |
| Siliceous earth | 2.0 |
| Slaked lime | 3.0 |
| Sodium carbonate | 3.0 |
| Sodium sulphate | 1.5 |
| Copper sulphate | 0.5 |
| Sodium fluosilicate | 1.4 |
| Sodium chloride | 0.8 |
| Ammonium lignin sulphonate | 0.3 |
| Water | 108.0 |

The main characteristics of this composition are its very high penetrating power and the very long period during which it remains in the fluid state.

Example 4

For filling large caverns that are close at hand and in the presence of rapidly flowing underground water, there may be used the following cement composition:

|  | Parts |
|---|---|
| Portland cement | 100.0 |
| Fly ash | 25.0 |
| Quicklime | 8.0 |
| Sodium carbonate | 4.0 |
| Calcium carbonate | 0.3 |
| Aluminium sulphate | 1.8 |
| Aluminium fluosilicate | 0.2 |
| Sodium chloride | 0.7 |
| Aluminium chloride | 0.3 |
| Water | 73.0 |

This composition remains in the fluid state only for a short period, and it hardens very rapidly and is very dense.

Example 5

In cases where the water is flowing at a normal speed, and the cement composition has to be piped over a short distance, the following cement mixture may be used:

|  | Parts |
|---|---|
| Portland cement | 100.0 |
| Fly ash | 20.0 |
| Slaked lime | 5.0 |
| Sodium carbonate | 4.3 |
| Aluminium sulphate | 2.0 |
| Sodium chloride | 1.0 |
| Water | 92.0 |

This composition remains in the fluid state for a moderate length of time, and sets very rapidly and is very dense.

Example 6

When the earth is chamically aggressive, the chemical resistance of the cement composition may be increased by increasing the proportion of hydraulic substances and adding a vinyl polymer, as illustrated by the following composition:

| | Parts |
|---|---|
| Portland cement | 100.0 |
| Fly ash | 38.0 |
| Siliceous earth | 5.0 |
| Basic granulated blast furnace slag | 5.0 |
| Slaked lime | 2.0 |
| Sodium carbonate | 4.6 |
| Aluminium sulphate | 2.1 |
| Sodium chloride | 1.2 |
| Polyvinyl acetate | 4.0 |
| Water | 94.0 |

In addition to being highly resistant to chemical attack, this composition has an improved resistance to frost.

Example 7

When the cement composition is to be used for filling concrete cable ducts, bentonite may be added in addition to fly ash and siliceous earth. The proportion of inorganic salts may be decreased and chlorides omitted. Polyvinyl acetate and ammonium lignin sulphonate may be included in the mixture, and foamed polystyrene may be used as inert filler.

| | Parts |
|---|---|
| Portland cement | 100.0 |
| Fly ash | 10.0 |
| Siliceous earth | 3.0 |
| Bentonite | 2.0 |
| Slaked lime | 10.0 |
| Sodium carbonate | 2.5 |
| Copper sulphate | 0.3 |
| Aluminium sulphate | 1.4 |
| Sodium fluosilicate | 0.8 |
| Ammonium lignin sulphonate | 0.2 |
| Polyvinyle acetate | 3.0 |
| Aluminium powder | 0.01 |
| Water | 64.0 |
| Foamed material | 25.0 |

No sedimentation occurs with this composition, it remains in the fluid state for a long time, and has a good adhesive power. It swells slightly and increases the resistance of steel to corrosion. It has an improved resistance to frost and is very dense.

Example 8

The following cement composition is suitable for filling joints:

| | Parts |
|---|---|
| Portland cement | 100.0 |
| Fly ash | 15.0 |
| Bentonite | 1.0 |
| Basic granulated blast furnace slag | 5.0 |
| Slaked lime | 5.0 |
| Sodium carbonate | 2.0 |
| Potassium carbonate | 0.2 |
| Copper sulphate | 0.3 |
| Aluminium sulphate | 1.2 |
| Sodium fluosilicate | 1.2 |
| Ammonium lignin sulphonate | 0.1 |
| Polyvinyl acetate | 6.0 |
| Aluminium powder | 0.01 |
| Water | 77.0 |

This composition has an increased resistance to frost and an improved adhesive power, swells slightly, and is very dense.

Example 9

A cement mixture suitable for the production of hollow concrete has the following composition:

| | Parts |
|---|---|
| Portland cement | 100.0 |
| Fly ash | 20.0 |
| Siliceous earth | 5.0 |
| Quicklime | 4.0 |
| Slaked lime | 4.0 |
| Sodium carbonate | 3.5 |
| Sodium sulphate | 1.0 |
| Aluminium chloride | 0.5 |
| Aluminium fluosilicate | 0.5 |
| Water | 75.0 |
| Inert filler | 50.0 |

This composition has a very low viscosity when first mixed, and is of great final strength.

Example 10

A cement mixture that is suitable for concreting under water, for example, for filling heaps of stones with mortar under pressure, has the following composition:

| | Parts |
|---|---|
| Portland cement | 100.0 |
| Fly ash | 25.0 |
| Quicklime | 8.0 |
| Sodium carbonate | 2.6 |
| Sodium sulphate | 1.0 |
| Copper sulphate | 0.4 |
| Aluminium sulphate | 1.8 |
| Sodium chloride | 1.0 |
| Sodium fluosilicate | 1.2 |
| Ammonium lignin sulphonate | 0.2 |
| Aluminium powder | 0.01 |
| Water | 84.0 |
| Inert filler | 100.0 |

This mixture is of low viscosity and remains in the fluid state for a long time. It swells slightly, sets very rapidly and is highly resistant to corrosion.

TABLE

The ingredients of the cement compositions given in the foregoing examples should not be mixed with one another arbitrarily. They are prepared in accordance with the above process of the invention by first taking up the inorganic salts, the surface-active substance and the vinyl polymer, in order of sequence described above, in a part of the total amount of water, maintaining the aqueous liquor at a temperature of 25–50° C. for 8 to 16 hours, and then allowing the liquor to ripen for at least 72 hours with the free access of air. Immediately before use on the site, the remainder of the water is added, and the solid substances are mixed with the liquor. Care must be taken that the cement is not added later than the other solids. It is advantageous first to grind the other solids, then mix them with the cement, and then introduce the mixed solids into the liquor.

TABLE 1

| | Cement composition of Example | | | | | | | | | |
|---|---|---|---|---|---|---|---|---|---|---|
| Technological property | 1 | 2 | 3 | 4 | 5 | 6 | 7 | 8 | 9 | 10 |
| Penentrating power [1] | Medium | High | Very high | Low | Medium | Low | High | High | Low | High |
| Period of fluidity | Medium | Long | Very long | Short | Medium | Short | Medium | Medium | Medium | Long |
| Rate of setting | Very high | High | Medium | High | Medium | High | Medium | Medium | Medium | High |
| Rate of hardening | Very high | High | Medium | Very high | High | Medium | Medium | Medium | Medium | High |
| Final strength | Very high | High | High | Medium | High | Medium | Medium | Medium | High | High |
| Density | Very high | High | Medium | Very high | High | High | Very high | High | Medium | Medium |
| Swelling | None | None | None | None | None | None | Occurs | Occurs | None | Occurs |
| Adhesion | Normal | Normal | Normal | Normal | Normal | Improved | Improved | Improved | Normal | Normal |
| Chemical resistance | High | Moderate | Moderate | High | Moderate | Very high | Moderate | High | Moderate | High |
| Frost resistance | Increased | Normal | Normal | Normal | Normal | Increased | Increased | Increased | Normal | Normal |

[1] Degree of hardening.

We claim:
1. A process for the preparation of a cement composition consisting essentially of:
(a) inorganic salts consisting of 2 to 5 parts of at least one water-soluble carbonate of a monovalent metal, 1 to 4 parts of at least one water-soluble sulfate of a mono- to trivalent metal, 0 to 2 parts of a water-soluble fluosilicate of a mono- to trivalent metal, 0 to 2 parts of a water-soluble chloride of a mono- to trivalent metal;
(b) surface-active substance in the amount of 0 to 0.5 parts;
(c) 0 to 10 parts of a polyvinyl polymer;
(d) solid ingredients consisting essentially of 10 to 50 parts of at least one hydraulic additive member selected from the group consisting of fly ash, siliceous earth, bentonite and basic granulated blast furnace slag, 2 to 10 parts of an aerial binding agent of at least one member from the group consisting of quicklime and slaked lime, 0 to 0.5 parts of a gas generating substance, and 0 to 200 parts of an inert filler and 100 parts portland cement; and
(e) sufficient water to provide about 50 to 200 parts water in the entire composition, all parts being expressed by weight per 100 parts portland cement, said process comprising the steps of dissolving the water soluble inorganic salts, the surface-active substance, and the vinyl polymer in a part of the total amount of water, maintaining the resulting aqueous liquor at a temperature of 25 to 50° C. for 8 to 16 hours, then ripening said liquor for at least 72 hours with the free access of air, then mixing the resulting ripened concentrate, immediately before the cement composition is required for use, with the remainder of the water and then adding the solid ingredients including portland cement to the liquor.

2. A process as claimed in claim 1, wherein said fluosilicate, carbonate, sulfate and chloride salts are added in that sequence and wherein each salt is completely dissolved before the next salt is added.

3. A process as claimed in claim 2 wherein said surface-active substance and said vinyl polymer are added after all said inorganic salts have been dissolved.

4. A process as claimed in claim 1 wherein said surface-active substance is a lignin-sulfonic acid derivative.

5. A process as claimed in claim 1 wherein said gas-generating substance is powdered aluminum.

References Cited

UNITED STATES PATENTS

| | | | |
|---|---|---|---|
| 3,087,825 | 4/1963 | Meier-Grolman | 106—89 |
| 2,990,382 | 6/1961 | Wagner et al. | 106—90 |
| 2,987,407 | 6/1961 | Ulfstedt et al. | 106—97 |
| 2,646,360 | 7/1953 | Lea | 106—90 |
| 2,288,556 | 6/1942 | Vollmer | 106—89 |
| 1,997,782 | 4/1935 | Windecker | 106—89 |
| 1,907,003 | 5/1933 | Rice | 106—98 |
| 1,712,818 | 5/1929 | Forsen | 106—98 |

FOREIGN PATENTS 648,626  9/1962  Canada.

HELEN M. McCARTHY, Primary Examiner

W. T. SCOTT, Assistant Examiner

U.S. Cl. X.R.

106—90, 97, 98; 260—29.6